US007123625B2

(12) United States Patent
Dufour et al.

(10) Patent No.: US 7,123,625 B2
(45) Date of Patent: Oct. 17, 2006

(54) METHOD AND APPARATUS FOR IN-SERVICE DYNAMIC ALLOCATION OF BANDWIDTH IN A TDM NETWORK

(76) Inventors: Allan Dennis Dufour, 85 Prud'Homme, Hull, Quebec (CA) J8Y 5V6; Ronald Arthur Frank, 715 Hunterston Rd..N.W., Calgary, Alberta (CA) T2K 4M5

( * ) Notice: Subject to any disclaimer, the term of this patent is extended or adjusted under 35 U.S.C. 154(b) by 1112 days.

(21) Appl. No.: 10/034,235

(22) Filed: Dec. 28, 2001

(65) Prior Publication Data

US 2003/0123472 A1    Jul. 3, 2003

(51) Int. Cl.
H04L 12/43 (2006.01)
H04J 3/16 (2006.01)
H04J 3/12 (2006.01)

(52) U.S. Cl. .............. 370/459; 370/465; 370/522

(58) Field of Classification Search ........... 370/442, 370/458–9, 498, 522, 527–8, 465, 466, 907
See application file for complete search history.

(56) References Cited

U.S. PATENT DOCUMENTS 6,108,347 A * 8/2000 Holmquist ............... 370/458
6,353,618 B1 * 3/2002 Hung et al. .............. 370/459
6,519,280 B1 * 2/2003 Cole ....................... 375/222

* cited by examiner

Primary Examiner—Chau Nguyen
Assistant Examiner—Kerri M. Dyke
(74) Attorney, Agent, or Firm—Merek, Blackmon & Voorhees, LLC

(57) ABSTRACT

A method and mapper apparatus for reallocating bandwidth used by a data tributary comprising data units, during transport of the data tributary over a communications link by a time division multiplexing (TDM) frame (e.g., a SONET frame comprising N×STS-1s) from a source device to a sink device. Each the data unit occupies one time slot of the frame and the data units are encoded to differentiate between payload data and control codes. At the source device, a designated code (IGNORE CODE) is inserted in each unallocated time slot to identify that the time slot contains no payload data (the designated code being ignored by the sink device). New set(s) of time slots to be allocated (i.e., to increase bandwidth) or de-allocated (i.e., to decrease bandwidth) to the tributary are determined. The new set(s) of time slots are communicated to the sink device. Confirmation of the communication is received from the sink device.

15 Claims, 6 Drawing Sheets

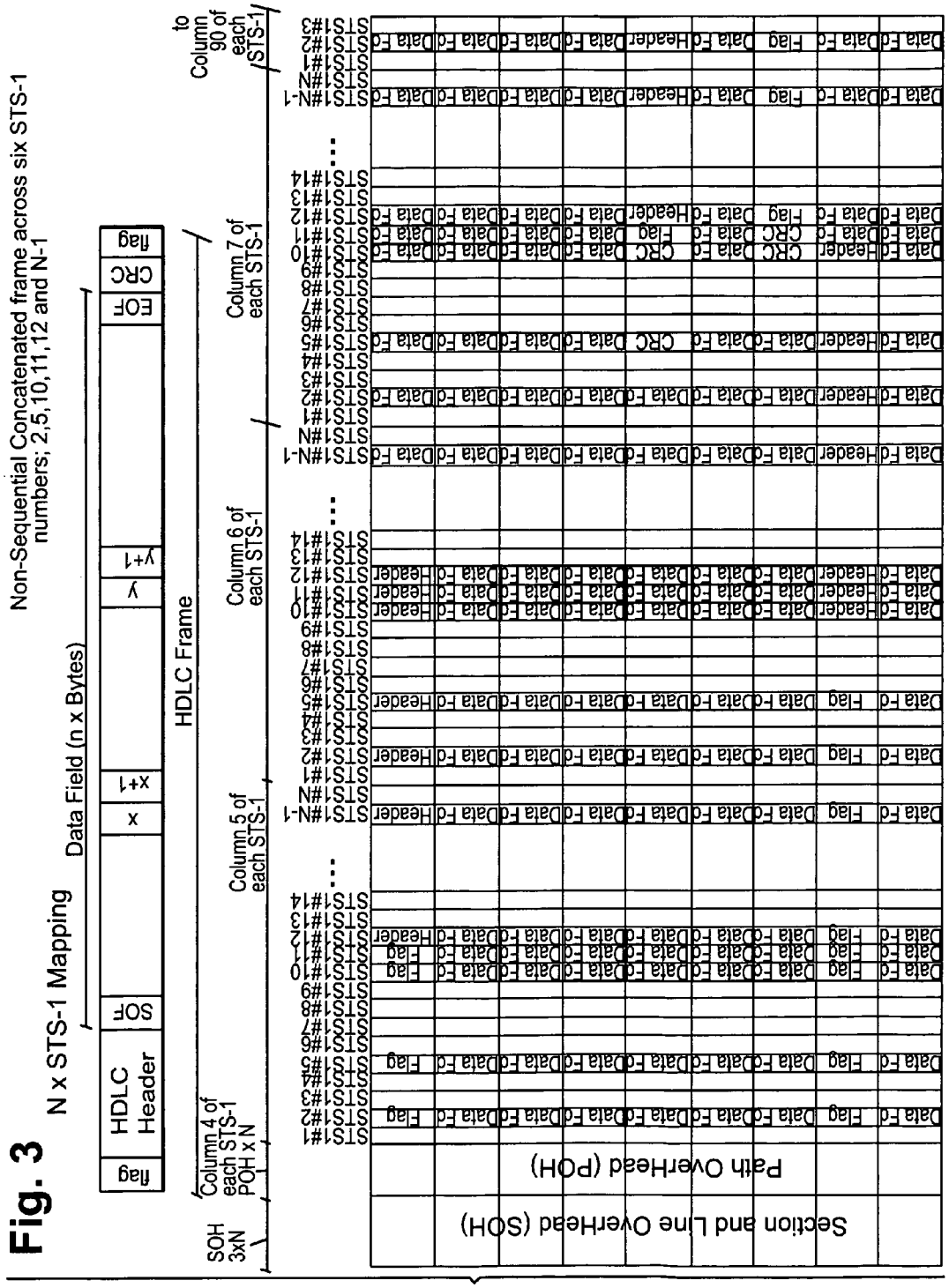
Fig. 3 N x STS-1 Mapping

METHOD AND APPARATUS FOR IN-SERVICE DYNAMIC ALLOCATION OF BANDWIDTH IN A TDM NETWORK

CROSS-REFERENCE TO RELATED APPLICATIONS

Not applicable.

BACKGROUND OF THE INVENTION

1. The Field of the Invention

This invention relates to a method and apparatus for allocating bandwidth in a TDM network (e.g., STS-1s in a SONET (synchronous optical network)/SDH (synchronous digital hierarchy) network), amongst clients, on an in-service (i.e., without any interruption in the transport of data) and dynamic basis.

2. The Relevant Technology

Time Division Multiplexing (TDM) protocols such as SONET/SDH are used in optical fibre networks to transport data across the network. The SONET protocol enables data to be aggregated from several tributaries in a simple manner but the allocation or re-allocation of bandwidth between the tributaries is more difficult to accomplish with this protocol.

A SONET signal (i.e., such as STS-48, meaning 48 synchronous transport streams) is typically composed of multiple STS-1's which are assigned to various resources or clients, with the greater the number of STS-1's representing increased bandwidth. Advantageously, the assignment of bandwidth to each client is flexible in that it can be assigned and changed based on any number of applied control parameters. An aggregator aggregates (i.e., combines) the client STS-1's into a composite STS payload (e.g., STS-48 or STS-192) and the aggregate data stream is fed into a SONET transmit framer to insert section/line/path overhead information (data) and create a proper SONET frame.

The tributary data for SONET networks is typically encoded (for example, using HDLC) in such a manner as to differentiate between payload data and control codes used for signaling. In addition most encoding schemes are also encapsulation schemes in that they provide control codes for delineating the start and end of frames.

Typically, reallocating the STS-1's amongst the clients is done by re-provisioning, whereby the data channel between the clients of the transmit and receive nodes must be taken out of service, resulting in an interruption of communications and service. The proposed LCAS (Link Capacity Adjustment Scheme) standard for SONET provides a method for reallocating bandwidth using virtual concatenation but this method is relatively complex. Moreover, this method may not allow for optimum recovery in the event that a protection switch occurs during a reallocation of bandwidth.

Known methods for in-service bandwidth reallocation depend on the occurrence of synchronized events at each of the transmit and receive nodes of the data transport link (the transmit node being within a source device and the receive node being within a sink device). Consequently, since one such event (e.g., a reallocation "switch trigger") might be lost or corrupted by or during a protection switch event, these methods are vulnerable to protection switching events which may produce severe data errors (resulting from an inability of the sink device to correctly extract the data) and/or interfere with successful completion of a reallocation process.

There is a need, therefore, for means to reallocate STS-1's amongst clients on an in-service and dynamic basis without interference by the occurrence of a protection switching event.

BRIEF SUMMARY OF THE INVENTION

In accordance with the invention there is provided a method for reallocating bandwidth used by a data tributary comprising data units, during transport of the data tributary over a communications link by a time division multiplexing (TDM) frame from a source device to a sink device. Each data unit occupies one time slot of the frame and the data units are encoded to differentiate between payload data and control codes. At the source device, a designated code is inserted in each unallocated time slot to identify that the time slot contains no payload data (the designated codes being ignored by the sink device). New set(s) of time slots to be allocated or de-allocated to the tributary are determined. The new set(s) of time slots are communicated to the sink device. Confirmation of the communication is received from the sink device. If the new set(s) of time slots are being allocated to the tributary, the data units are inserted into the new set(s) of time slots allocated to the tributary. If the new set(s) of time slots are being de-allocated to the tributary, the insertion of data units is discontinued for the new set(s) of time slots de-allocated to the tributary. Both the inserting or discontinuing of insertion of data units into the new set(s) of time slots commences upon the confirmation receipt.

The TDM frame for the illustrated preferred embodiment is a SONET frame and, thus, the set(s) of time slots are STS-1s. Insertion of the designated codes is performed by a mapper of the source device and the designated codes are terminated in a demapper of the sink device. The bandwidth of the tributary is increased when the new set(s) of time slots are allocated to the data tributary and the bandwidth of the tributary is decreased when the new set(s) of time slots are de-allocated to the data tributary.

For an embodiment using 8b/9b encoding each data unit comprises 9 bits consisting of an 8 bit information octet, being either a control octet or a data octet, and one octet type bit identifying the octet as control or data. In this embodiment the data units are mapped, in a cyclic manner, into each the new STS-1 allocated thereto by mapping the information octets of each sequence of 8 data units to eight of a sequence of nine contiguous timeslots of each the new STS-1 and mapping the octet type bits for each the mapped sequence of information octets to a ninth octet of the contiguous time slots of each the new STS-1.

For an alternate embodiment in which data tributaries are encoded using the HDLC protocol, the protocol is modified so that the designated code is escaped where it appears in payload data units.

In accordance with a further aspect of the invention there is provided an apparatus within a mapper/damapper for reallocating bandwidth used by a data tributary comprising data units during transport of the data tributary over a communications link by a time division multiplexing (TDM) frame from a source device to a sink device. Each data unit occupies one time slot of the frame and the data units are encoded to differentiate between payload data and control codes. Each of the source and sink devices comprise the apparatus. A designated code generator is configured for generating and inserting into each unallocated time slot a designated code to identify that the time slot contains no payload data (and the apparatus is configured to ignore the designated codes received at the sink device). A bandwidth re-allocation identifier is configured for identifying new set(s) of time slots to be allocated or de-allocated to the tributary. A bandwidth re-allocation signaller is configured for communicating to the sink device the new set(s) of time slots and for receiving confirmation of the communication from the sink device. A data unit inserter is configured for inserting the data units into the new set(s) of time slots allocated to the tributary, if the new set(s) of time slots are being allocated to the tributary, and for discontinuing insertion of the data units into the new set(s) of time slots de-allocated to the tributary, if the new set(s) of time slots are being de-allocated to the tributary, wherein the inserting or discontinuing insertion of data units into the new set(s) of time slots is commenced upon the confirmation receipt.

The TDM frame may be a SONET frame whereby the set(s) of time slots are STS-1s. An apparatus according to claim 9 configured to ignore the designated codes received at the sink device. When an encoding method is used which produces data units comprising 9 bits consisting of an 8 bit information octet, being either a control octet or a data octet, and one octet type bit identifying the octet as control or data, the apparatus further comprises a cyclical mapping component configured for mapping the data units, in a cyclic manner, into each the new STS-1 allocated thereto whereby the information octets of each sequence of 8 data units are mapped to eight of a sequence of nine contiguous timeslots of each the new STS-1 and the octet type bits for each the mapped sequence of information octets is mapped to a ninth octet of the contiguous time slots of each the new STS-1.

BRIEF DESCRIPTION OF THE DRAWINGS

Reference will now be made to the accompanying drawings which show, by way of example, an exemplary preferred embodiment of the present invention:

FIG. 3 illustrates, for purposes of instruction only, a mapping of an HDLC frame sequence into six STS-1s of a SONET frame which is N×STS-1 wide, whereby the mapping is done on a non-sequentially concatenated frame basis using STS-1 numbers 2, 5, 10, 11, 12 and N−1;

FIGS. 5 and 6 pertain to an alternate embodiment which maps the 8-bit/9-bit (8b/9b) encoded data (rather than applying HDLC encoding) wherein FIG. 5 illustrates a data/control byte sequence for 8b/9b encoding; and, FIG. 6 illustrates a method for mapping 8b/9b encoded sequences into an STS-1×N SONET frame.

DETAILED DESCRIPTION OF THE PREFERRED EMBODIMENTS

As shown by FIGS. 1–3, 8b/9b client data may be encoded using an encapsulation protocol such as HDLC and then mapped into an STS-n SONET frame using an 8b STS-n mapper. On the other hand, no encapsulation is necessary if a 9-bit STS-n mapper (not shown) is used to map the 8b/9b client data, in which case the 8b/9b data at stage "B" shown in FIG. 1(b), consisting of 8 data bits and 1 control bit, is fed directly into a 9-bit STS-n mapper. However, independent of the encoding used (HDLC or 8b/9b), it is necessary to be able to differentiate the 8 bits of data from special control codes. When the HDLC protocol is used, the user data is prefixed with a special code to "escape" user data that looks like a control code.

Figure 1:
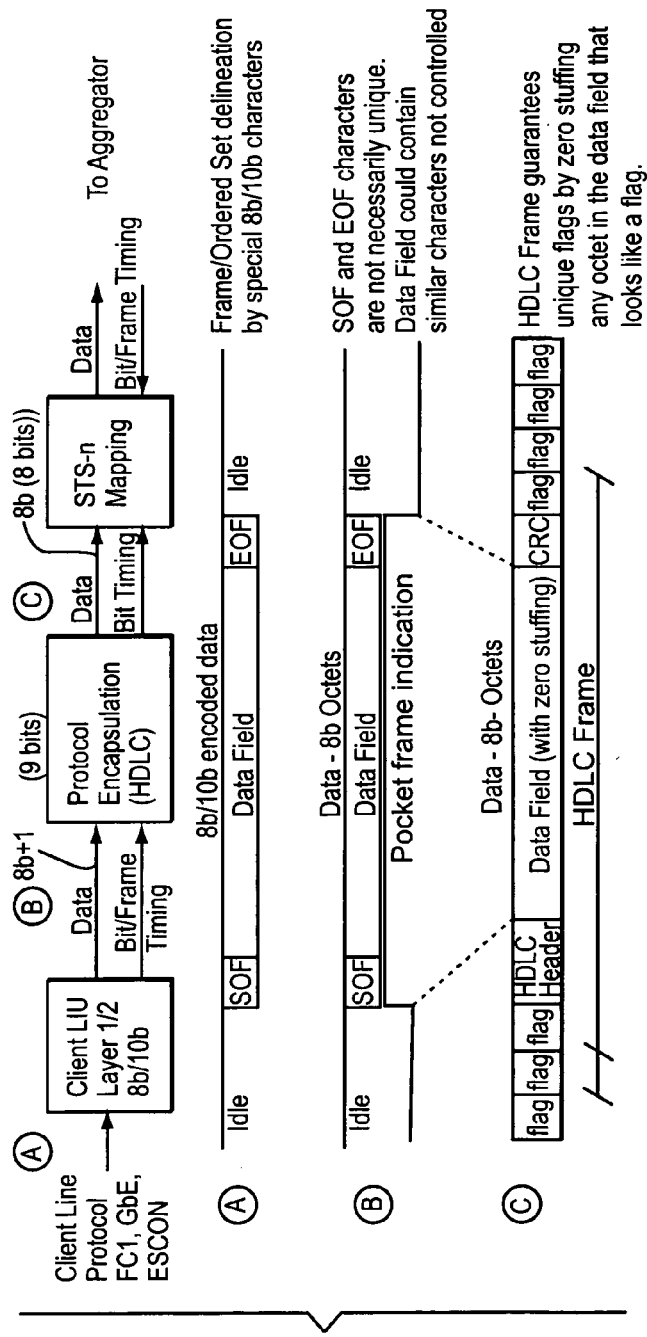
FIGS. 1(a) and (b) illustrate an exemplary method of encoding tributary data, namely, encoding the tributary data into an HDLC protocol frame (per FIG. 1(a)) for processing by a mapper and aggregator to multiplex the data into a SONET frame.
Figure 2:
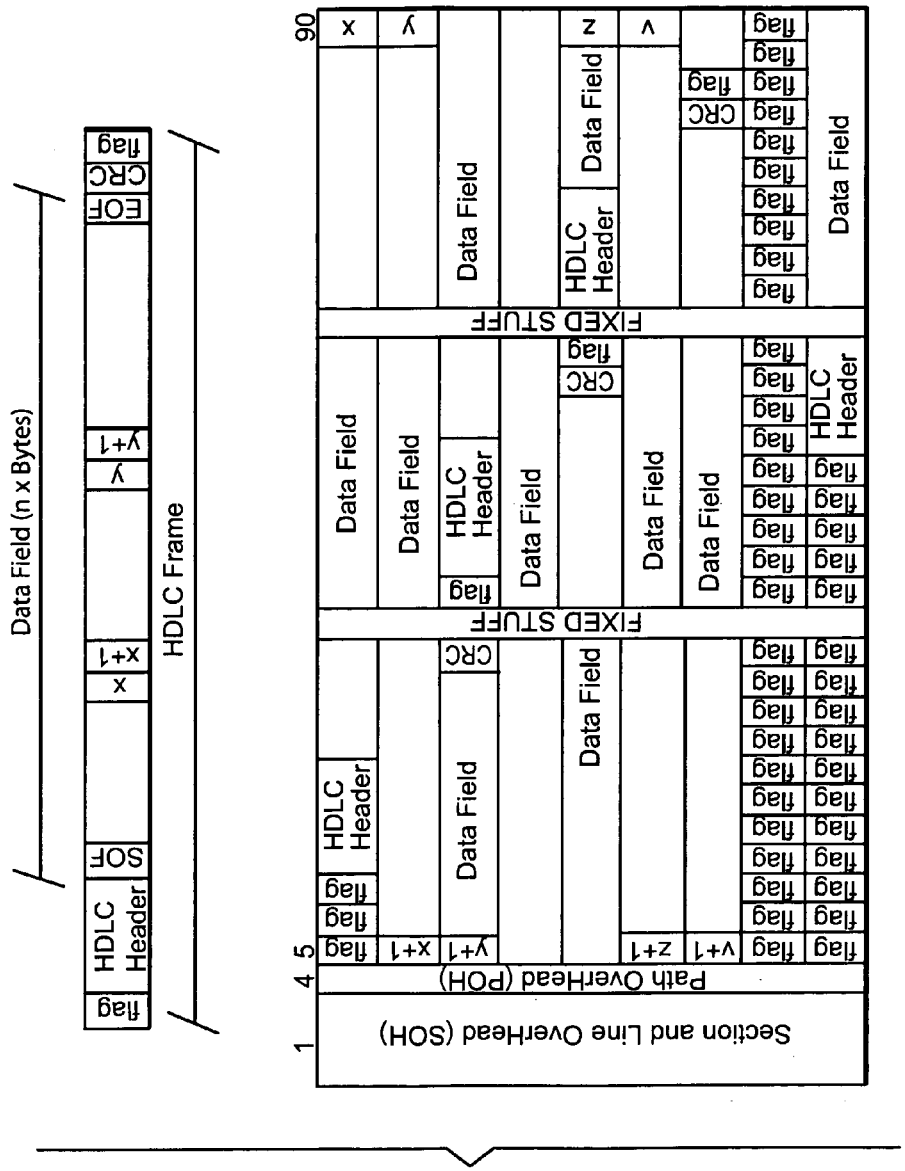
FIG. 2 shows, for purposes of instruction only, a mapping of an HDLC frame sequence into a single STS-1.

Mapping of HDLC encoded frames is straightforward and is illustrated by FIGS. 1–3 as follows. FIGS. 1(a) and (b) show an encoding of an exemplary tributary HDLC protocol frame (per FIG. 1(a)) for processing by an 8-bit STS-n mapper and aggregator to multiplex the data into a SONET frame. As is well-known by persons skilled in the art, HDLC framing is done by an HDLC encoder utilizing octet stuffing (as necessary) to ensure that the frame content never matches the frame delineation flag in value. A flag sequence of an HDLC frame is a binary sequence used for frame synchronization, the address field is a double octet, the control field is a single octet identifying the frame type (i.e., client data, primitive sequence, client path messaging or path flow management) and an optional control frame type field identifies the type of control frame (used only when the frame type is path messaging or flow management). The data field's organization is dependent upon the type of frame it is: client data frames may have FC or GbE frames embedded in them, for example, whereas path messaging or flow management frames would normally have a fixed length and content type according to the type of frame. A frame check sequence (FCS) field (also referred to as the Cyclical Redundancy Check (CRC)) defaults to 16 bits (two octets) and is calculated over all bits of the address, control, control frame type and data fields. FIGS. 2 and 3 are provided to show the method of mapping HDLC frame sequences into a SONET frame, as is well known in the art; FIG. 2 shows a simple mapping of an HDLC frame sequence into a single STS-1 and FIG. 3 shows a mapping of an HDLC frame sequence into six STS-1s of a SONET frame which is N×STS-1 wide (i.e., STS-n mapping) whereby the mapping is done on a non-sequentially concatenated frame basis using STS-1 numbers 2, 5, 10, 11, 12 and N−1.

For a 9-bit mapper implementation (i.e., an alternate embodiment in which HDLC encoding is not used), the information characters input to the mapper are 9-bit units converted from the client input line code (e.g., FC or GbE) as follows. The 8b10b structure of the input line code is converted by a converter to 8 bits of information, being the first 8 bits of the character, and 1 "SCGI" (special code group identifier) bit, being the $9^{th}$ bit of the character, identifying the type of that information (i.e., control or data type). Thus, an information character comprises an 8 bit value (which may be any value from 0–256) and one octet type bit which identifies that value type as either control or data. For this implementation, it is necessary that a 9-bit mapper be used and the 9-bit mapper must collect all SCGI bits into separate bytes and place those SCGI bytes into a separate column of the STS-n frame on their own.

For the dynamic bandwidth allocation apparatus and method of the invention the control field for the tributary data format is expanded to include a designated code which is referred to herein as an IGNORE control code (or "IGNORE code"). The IGNORE control code is used to indicate that the current/corresponding byte (or other defined block of information) contains no payload data. The IGNORE code is generated and inserted by a designated code generator of the mapper into transient timeslots (those unallocated or in the process of being reassigned) within the TDM frame on the ingress side (i.e., in the source device). When an IGNORE code (character) is received on a timeslot on the egress side (i.e., in the sink device) that data/timeslot is ignored (thus, the IGNORE code is both generated and terminated by the mapper/demapper). For HDLC-encoded data, both the HDLC encoder and decoder must be modified to "escape" the IGNORE code if and where it appears in user data. On the other hand, for 9 bit-encoded data, the IGNORE code is one of the 244 (256−12) unused "K-codes".

Figure 4A:
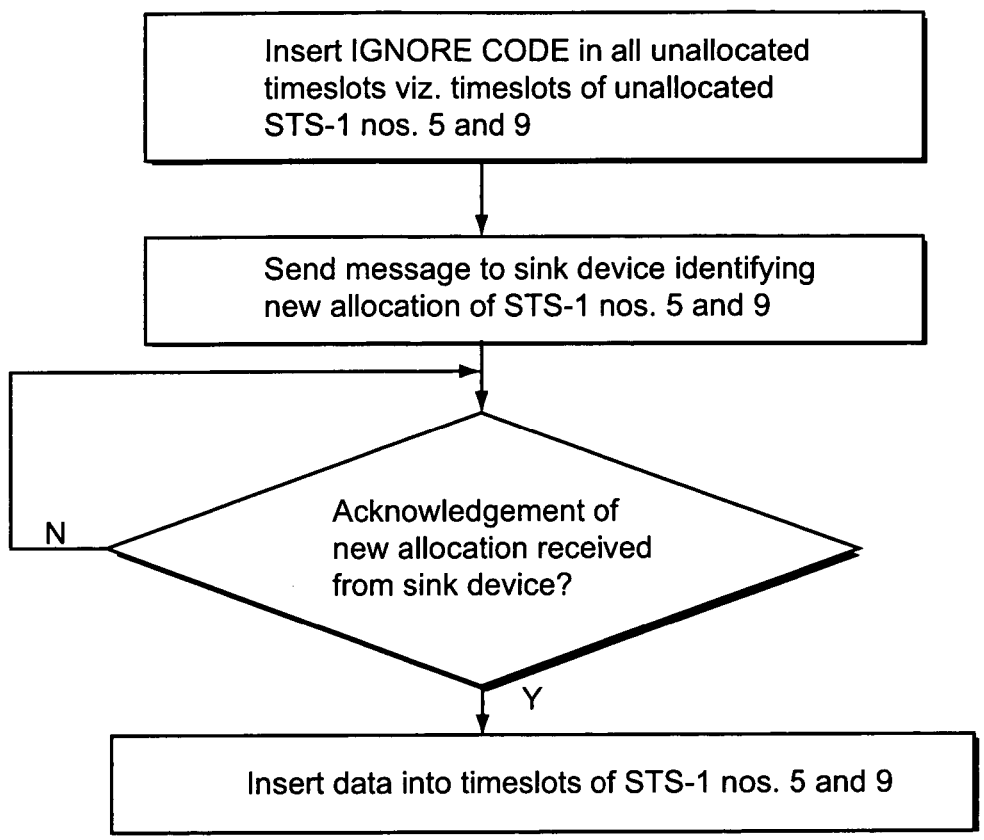
FIGS. 4(a) and (b) are flowcharts showing the steps performed by the apparatus of the source device, according to the invention, to re-allocate bandwidth, FIG. 4(a) showing the steps performed to increase bandwidth by two STS-1s (viz. nos. 5 and 9) and FIG. 4(b) showing the steps performed to decrease bandwidth by two STS-1s (viz. nos. 5 and 9)

For the illustrated embodiment herein, the TDM frame is a SONET frame and, therefore, timeslot allocation/granularity is based on STS-1s. The bandwidth allocation method of the invention is described in the following with reference to the flowcharts of FIGS. 4(a) and (b) which illustrate a specific example of bandwidth re-allocation whereby the bandwidth of a tributary is increased from consisting of STS-1 numbers 1, 3 and 7 in a SONET STS-N frame to also include STS-1 numbers 5 and 9. FIG. 4(a) shows the steps performed by the apparatus to increase bandwidth by two STS-1s (nos. 5 and 9) and FIG. 4(b) shows the steps performed by the apparatus to decrease bandwidth by two STS-1s (nos. 5 and 9).

For the example of increasing bandwidth (as shown by FIG. 4(a)) the STS-1s to be added (5 and 9) are initially unallocated; thus, they carry the IGNORE code which has been inserted into all unallocated timeslots by the designated code generator of the mapper/demapper. A bandwidth re-allocation identifier of the mapper/demapper is configured for identifying new set(s) of time slots to be allocated to the tributary, the set(s) of time slots being STSs 5 and 9 in this example. A bandwidth re-allocation signaller of the apparatus sends a message to the sink device (i.e., the egress side), via a signalling channel, identifying that STS-1s 5 and 9 now belong to the tributary. It is to be noted that, at this time, the IGNORE code is being received by the sink device on two of the five STS-1s belonging to the tributary; however, these are "filtered out" (i.e., ignored) during demapping. The bandwidth re-allocation signaller then awaits an acknowledgement from the sink device (via a signalling channel) that the bandwidth increase has been performed. Thereafter, a data unit inserter of the mapper/demapper commences (at any time) to insert data units into the new set(s) of time slots being allocated to the tributary (i.e., STS-1s 5 and 9).

Figure 4B:
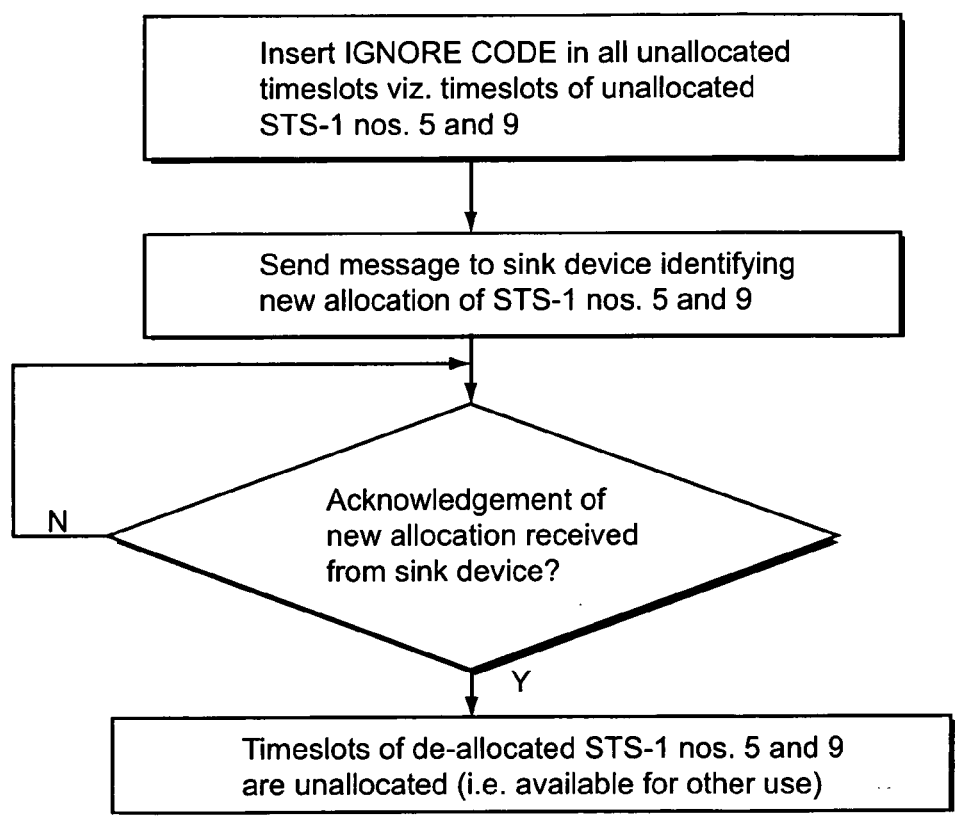

For the example of decreasing bandwidth (as shown by FIG. 4(b)) the STS-1s to be removed (5 and 9) begin, on the ingress side, to carry the IGNORE code instead of payload data. As stated, this IGNORE code is filtered out by the demapper on the egress side. The bandwidth re-allocation signaller sends a message to the egress side (via a signalling channel) identifying that the STSs to be de-allocated (i.e., STSs 5 and 9 identified by the bandwidth re-allocation identifier) no longer belong to the tributary. On receipt of this message the sink device no longer regards these STS-1s as being part of the tributary. The bandwidth re-allocation signaller then awaits an acknowledgement from the sink device (via a signalling channel) that the bandwidth decrease has been performed. Thereafter the data unit inserter discontinues inserting data units into the new set(s) of time slots being de-allocated to the tributary (i.e., STSs 5 and 9) and the ingress side may use the de-allocated STS-1s (5 and 9) for other purposes (i.e., they now become unallocated).

The acknowledgement signalling consists of a simple "ping". Optionally, however, for further robustness, it may repeat back the instructed modification and await from the source device either an acknowledgment that this repeat is correct or, if the returned instruction is incorrect, a re-transmission of the instructed allocation modification.

It will be understood from the foregoing description of the bandwidth allocation method that no real-time synchronization is required between the ingress and egress sides. Although the sequence of the steps for bandwidth allocation is important, the time required for each step to occur is not. Advantageously, this provides robustness to the data link. In the event that a protection switch were to occur while the steps are being performed data and/or signalling messages indicating/confirming an allocation modification may be lost; however, a high-level protocol on the message channel will ensure such messages are re-sent. In the meantime, no data is transported over the newly allocated (or de-allocated) timeslots of a tributary, until end-to-end confirmation of the intended modification is in hand; following that, data may be inserted to/removed from the allocated/de-allocated timeslots following an arbitrary delay.

Figure 5:
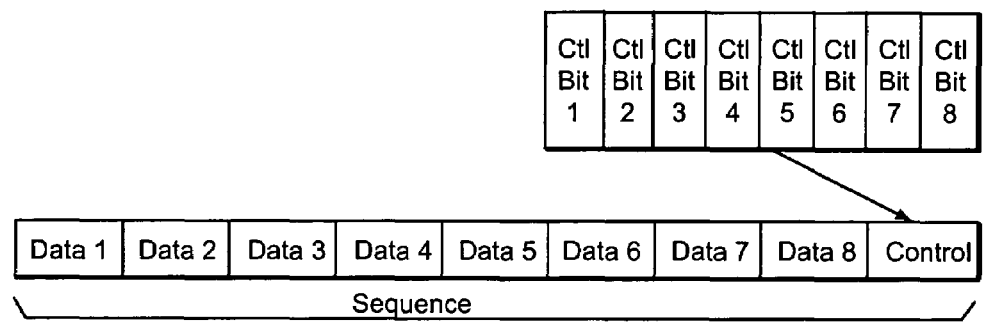
Figure 6:
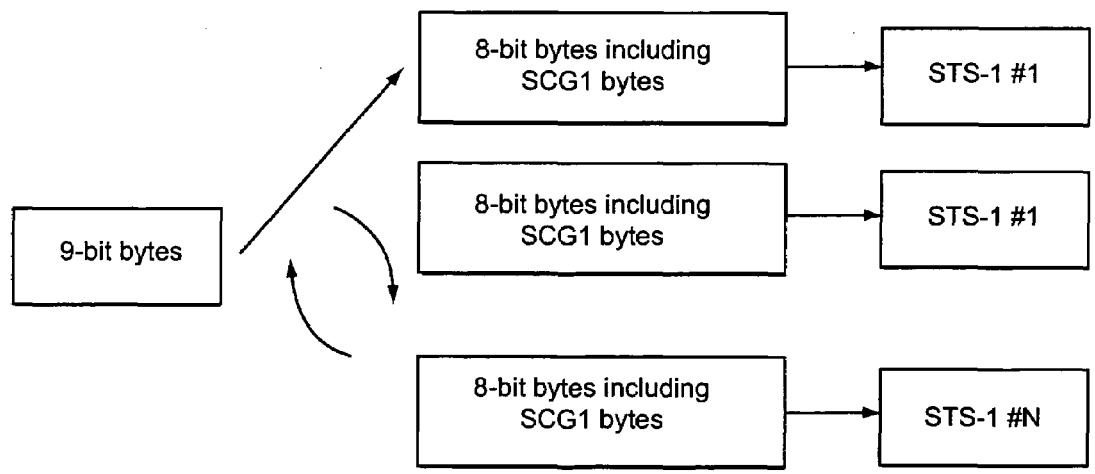

For 9-bit encoding (i.e., where an HDLC encoder is not used), a mapping algorithm is applied by a mapper to map each sequence of eight 9-bit characters input to the mapper to a sequence of nine octets of an STS-1 of the SPE, wherein the first eight octets correspond to the values of the eight characters and the ninth octet comprises the input octet type bit for each of those eight values to identify them as control or data values as shown by FIG. 5. FIG. 6 illustrates the method used to map the 8-bit byte/SCGI byte encoded sequences (per FIG. 5) into an STS-1×N SONET frame.

In order to support the bandwidth allocation method the timeslot mapping algorithm employed must be suitably adapted to the encoding protocol used (or vice versa). The encoding protocol must remain functional even when there is some uncertainty as to which STS-1s are assigned to a given tributary, as will occur during re-allocation (i.e., certain STS-1s will be considered part of the tributary by the source device and not the sink device, or vice versa, during bandwidth reallocation). Specifically, it is necessary to ensure that SCGIs are correctly recognized as such by the sink device and that they are properly correlated at the sink device with data bytes so that true data bytes, IGNORE codes, and other special codes are correctly interpreted.

The mapping method shown by FIG. 6, for 8-bit/9-bit byte encoding, supports the present bandwidth allocation method of the invention. Nine-bit bytes are fed in a cyclic manner, by a cyclical mapping component of the mapper, to several, parallel SCGI byte encoders, one per active (i.e., not transmitting IGNORE bytes) STS-1 allocated to the client. Therefore, the assembled byte sequences for each parallel encoder are exclusively packed into their corresponding, specific STS-1s. In this way, integrity of encoding is maintained within specific STS-1s. The correct sequence for data reconstruction from the sink is clear and unambiguous, since the sequence of transmission of STS-1 slots within a SONET frame is rigorously defined and unvarying. It is to be noted that it is not appropriate to use a mapping method which would simply assign the 8-bit byte plus SCGI (clumped bit) byte sequences into available STS-1 slots as they come up because for the bandwidth reallocation method of this invention the specific STS-1s containing SCGI bytes will then vary unless the number of STS-1s allocated to a tributary is an integral multiple of nine.

It is to be understood that the method claimed herein is implemented by software in the preferred embodiment, and the elements of the apparatus claimed herein are in the form of software, but the invention is not intended to be limited to such implementations and for different embodiments different implementations may be elected as appropriate.

The individual electronic, software and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiments shown and/or described herein by way of illustration are not intended to limit the scope of the invention claimed by the inventors which is defined by the appended claims.

What is claimed is:

1. A method for reallocating bandwidth used by a data tributary comprising data units during transport of said data tributary over a communications link by a time division multiplexing (TDM) frame from a source device to a sink device, each said data unit occupying one time slot of said frame and said data units being encoded to differentiate between payload data and control codes, said method comprising:
    (a) at said source device, inserting a designated code in each unallocated time slot to identify that said time slot contains no payload data;
    (b) determining new set(s) of time slots to be allocated or de-allocated to said tributary;
    (c) communicating to said sink device said new set(s) of time slots;
    (d) receiving confirmation of said communication from said sink device;
    (e) if said new set(s) of time slots are being allocated to said tributary, inserting said data units into said new set(s) of time slots allocated to said tributary; and,
    (f) if said new set(s) of time slots are being de-allocated to said tributary, discontinuing insertion of said data units into said new set(s) of time slots de-allocated to said tributary;
    (g) whereby said inserting or discontinuing insertion of data units into said new set(s) of time slots commences upon said confirmation receipt.

2. A method according to claim 1 whereby said TDM frame is a SONET frame and said set(s) of time slots are STS-1s.

3. A method according to claim 2 whereby said designated codes are ignored by said sink device.

4. A method according to claim 3 whereby said inserting of said designated codes is performed by a mapper of said source device and said designated codes are terminated in a demapper of said sink device.

5. A method according to claim 4 whereby said new set(s) of time slots are allocated to said data tributary whereby said bandwidth of said tributary is increased.

6. A method according to claim 4 whereby said new set(s) of time slots are de-allocated to said data tributary whereby said bandwidth of said tributary is decreased.

7. A method according to claim 2 whereby each said data unit comprises 9 bits consisting of an 8 bit information octet, being either a control octet or a data octet, and one octet type bit identifying said octet as control or data, said data units being mapped, in a cyclic manner, into each said new STS-1 allocated thereto by mapping said information octets of each sequence of 8 data units to eight of a sequence of nine contiguous timeslots of each said new STS-1 and mapping said octet type bits for each said mapped sequence of information octets to a ninth octet of said contiguous time slots of each said new STS-1.

8. A method according to claim 2 whereby said data tributary is encoded according to HDLC protocol and said designated code is escaped where it appears in payload data units.

9. An apparatus within a mapper/demapper for reallocating bandwidth used by a data tributary comprising data units during transport of said data tributary over a communications link by a time division multiplexing (TDM) frame from a source device to a sink device, each said data unit occupying one time slot of said frame and said data units being encoded to differentiate between payload data and control codes, each said source and sink devices comprising said apparatus, said apparatus comprising:
    (a) a designated code generator configured for generating and inserting into each unallocated time slot a designated code to identify that said time slot contains no payload data;
    (b) a bandwidth re-allocation identifier configured for identifying new set(s) of time slots to be allocated or de-allocated to said tributary;
    (c) a bandwidth re-allocation signaller configured for communicating to said sink device said new set(s) of time slots and for receiving confirmation of said communication from said sink device;
    (d) a data unit inserter configured for inserting said data units into said new set(s) of time slots allocated to said tributary, if said new set(s) of time slots are being allocated to said tributary, and for discontinuing insertion of said data units into said new set(s) of time slots de-allocated to said tributary, if said new set(s) of time slots are being de-allocated to said tributary, wherein said inserting or discontinuing insertion of data units into said new set(s) of time slots is commenced upon said confirmation receipt.

10. An apparatus according to claim 9 wherein said TDM frame is a SONET frame and said set(s) of time slots are STS-1s.

11. An apparatus according to claim 10 configured to ignore said designated codes received at said sink device.

12. An apparatus according to claim 11 wherein said bandwidth of said tributary is increased when said new set(s) of time slots are allocated to said data tributary.

13. An apparatus according to claim 11 wherein said bandwidth of said tributary is decreased when said new set(s) of time slots are de-allocated to said data tributary.

14. An apparatus according to claim 10 wherein each said data unit comprises 9 bits consisting of an 8 bit information octet, being either a control octet or a data octet, and one octet type bit identifying said octet as control or data, said apparatus further comprising a cyclical mapping component configured for mapping said data units, in a cyclic manner, into each said new STS-1 allocated thereto whereby said information octets of each sequence of 8 data units are mapped to eight of a sequence of nine contiguous timeslots of each said new STS-1 and said octet type bits for each said mapped sequence of information octets is mapped to a ninth octet of said contiguous time slots of each said new STS-1.

15. An apparatus according to claim 10 in combination with an HDLC encoder/decoder configured to escape said designated code where it appears in payload data units.

* * * * *